3,278,605
PROCESS FOR PRODUCING SATURATED ALDEHYDES
Shigeo Kawasaki and Katsumi Nakamura, Tokyo, Japan, assignors to Chisso Corporation, a corporation of Japan
No Drawing. Filed June 11, 1962, Ser. No. 201,268
Claims priority, application Japan, June 13, 1961, 36/20,446; May 18, 1962, 37/20,289
5 Claims. (Cl. 260—601)

This invention relates to a process for producing saturated aldehydes by the hydrogenation of corresponding unsaturated aldehydes in the gas phase.

This invention also relates to a durable safely-manageable catalyst having a novel composition which not only has a high hydrogenating ability but also a high selectivity for hydrogenating merely unsaturated linkages without acting on carbonyl groups and which is capable of being handled with such ease and safety that, even when brought into contact with air in its dried state, it neither inflames at all nor lowers its efficiency for a short period of time (e.g., several hours).

In conventional methods for producing saturated aldehydes according to gas phase reactions, catalysts composed mainly of nickel have been used. Namely, there have been proposed, for example, catalysts of a nickel-chromium-manganese system; nickel catalysts prepared by use of activators such as halides cyanides, nitrates, sulfates and chromates of alkali metals; and catalysts composed mainly of nickel and incorporated with one or two of aluminum, chromium and magnesium, which are present in their oxidized states. These catalysts are adhered to suitable carriers and brought into contact at proper temperatures with vapors of unsaturated aldehydes in which hydrogen has been incorporated to recover saturated aldehydes. All of these conventional catalysts are excellent in selectivity and preferentially hydrogenate double bonds of unsaturated aldehydes to produce saturated aldehydes with high efficiency. These catalysts are prepared with extreme ease and at low costs. Their marked characteristic is that they are comparatively stable in air even in their dried states and can be stored in the dried state as long as for several months under nitrogen without lowering their activities. On the other hand, these catalysts have the drawback that the presence of iron in the catalysts is extremely objectionable.

According to experiments carried out by the present inventors, when a catalyst—which contains, for example, 8–10 g. of metallic nickel and 2.8–3.5 g. of sodium chromate in 100 ml. of a finished catalyst prepared by use of a carrier of refined pumice, which has been prepared by crushing pumice into a size of 5–9 mm., treating the resulting pumice grain with hot dilute nitric acid to dissolve nitric acid soluble components present in the pumice and then washing the pumice with water to remove said components, followed by drying; is maintained at 120° C. and reacted with a gas mixture comprising equimolar amounts of crotonaldehyde vapor and hydrogen by introducing said gas mixture at a space velocity of 100/hr., the composition of the resulting effluent becomes as follows:

| | Percent |
|---|---|
| Crotonaldehyde | 12–16 |
| Butyraldehyde | 78–81 |
| Butanol | 3–4 |
| High boiling substances | 3 |

However, in case a reaction is effected under the same conditions as in the above-mentioned example in the presence of a catalyst of said system to which iron has further been added, i.e., by use of a catalyst having the composition of, for example, 8 g. of metallic nickel, 2.8 g. of sodium chromate and 2–6 g. of iron in 100 ml. of finished catalyst, the composition of the resulting effluent becomes:

| | Percent |
|---|---|
| Unreacted crotonaldehyde | 5–10 |
| Butyraldehyde | 62–79 |
| Butanol | 6–24 |
| High boiling substances | 5–9 |

As is clear from the above, in the case where iron is present in the catalyst, the formation of butanol increases to more than 2 times and that of the high boiling substances to 2–3 times as compared with the composition of the former effluent, though the conversion rate of crotonaldehyde is made higher. Thus, the yield of butyraldehyde, the desired product, is markedly lowered, whereby the efficiency of conversion thereof from crotonaldehyde is lowered. This tendency is seen not only in the case of the nickel-sodium chromate system catalyst cited above, but in those catalysts of nickel-sodium chloride, nickel-potassium sulfate, nickel-sodium nitrate, nickel-aluminum oxide, nickel-chromium oxide, nickel-chromium oxide-magnesium oxide and nickel-chromium oxide-manganese oxide systems. The above-mentioned properties are great drawbacks of these catalysts. Therefore in order to obtain a catalyst having high catalyst activity and long catalyst life, it is desirable to maintain the nickel concentration in the catalyst as high as possible. On the other hand, it is desirable to have the iron concentration in a catalyst having a high nickel concentration as low as possible.

However, in preparing catalysts on a commercial scale, apparatus is required which must be made of an iron alloy such as stainless steel, and therefore it is inevitable that iron, which dissolves out from such apparatus during the production operations with these catalysts, becomes commingled in the catalysts to a certain extent. Accordingly, the starting materials employed, including a carrier, should be selected from those having iron contents as small as possible, and also should be refined to remove iron content therefrom. This drawback is fatal in case nickel is intended to be reused by recovering it from a catalyst which has lost its activity. Metallic components in a catalyst deprived of its activity can be recovered in the form of an aqueous nitrate solution with an efficiency of 80–90% by calcining the catalyst in the presence of air or oxygen to burn and remove organic substances adhering thereto and then extracting metallic components with dilute nitric acid. In this case, however, a considerable amount of iron is also extracted with the nickel. Therefore, when a catalyst is prepared according to the conventional method, i.e., by use of the recovered nickel at a concentration of more than 10 g. per 100 ml. of the catalyst, its use results not only in large amounts of butanol as a by-product but also in considerable quantities of high boiling by-products. In case said aqueous nitrate solution recovered according to the above-mentioned process is purified to remove the iron content from the solution, no such question would occur. However, in a factory of such a scale that the amount of nickel treated is as small as several hundred kgs. per month, it is not advantageous economically to purify the solution. Therefore, the catalyst, in spite of the fact that it is made from expensive starting materials, must be discarded after merely a single use.

The present inventors have found a catalyst of a nickel-iron-activator system which has a novel composition. This catalyst is composed mainly of the aforesaid nickel, and the remainder is an activator selected from the alkali metal salts, oxides of aluminum, chromium, magnesium and manganese, and mixtures of said oxides. In this catalyst system, the presence of iron is not objectionable but, on decreasing the amount of nickel corresponding to the iron content within a certain limit, a catalyst having an efficiency as high as that of the aforementioned nickel system catalyst is obtainable. All the catalyst of the nickel-iron-activator system have excellent selective reactivities not only in the production of butyraldehyde according to a gas phase reaction of crotonaldehyde, but also in the preparation of saturated aldehydes according to the partial hydrogenation of unsaturated aldehydes having 3 to 6 carbon atoms in the gas phase.

The composition of the catalyst of the present invention is:

Nickel:iron=4.0–9.5:6.0–0.5
Nickel+iron:activator=7.0–9.0:3.0–1.0 by weight.

It is desirable to maintain the total amount of nickel and iron within a certain range. For example, when the total amount of iron and nickel is more than 12 g., the selectivity of reaction is considerably lost, whereby the yield of alcohol is markedly increased. On the contrary, when said total amount is less than 6 g., the conversion rate is lowered and the catalyst life becomes shorter, whereby its commercial value is reduced. Therefore, the total amount of nickel and iron in the finished catalyst should be less than 12 g. per 100 ml. of the catalyst and a preferable range for commercial purposes is 6 to 10 g.

The present catalyst is prepared in the following manner: A suitable carrier, for example, a pumice crushed into a proper grain size, is washed with hot dilute nitric acid. After washing with water and drying, the pumice is dipped in an aqueous solution prepared by dissolving nickel nitrate and iron nitrate together with one of the following: chromates; bichromates; a halide, nitrate or sulfate of and alkali metal; oxides of aluminum, chromium magnesium; and mixtures of said oxides. After adsorption is complete, the pumice is slowly evaporated to dryness. Then, the pumice is heated at 450° C. for several hours followed by a reduction with hydrogen at 450° C. for 5–10 hours.

Reaction conditions for achieving the object of the present invention by use of the catalyst of said system vary more or less depending on the variations of starting materials. The reaction temperature is desirably from 90° to 150° C., in general. It is of course necessary to vary said temperature according to the activities of the catalysts. Particularly, when a fresh catalyst having high activity is employed, it is desirable to carry out the reaction at relatively low temperatures. When the temperature is made higher, the amount of saturated alcohol formed becomes larger and, at the same time, undesirable reactions such as the decomposition reaction and the formation of high boiling substances become vigorous. In case the activity of catalyst is lowered, it is necessary to raise the temperature to increase the conversion. At temperatures above 150° C., however, the formation of saturated alcohol becomes marked and therefore it is not desirable to elevate the temperature higher than 150° C.

The molar ratio of unsaturated aldehyde to hydrogen present in a gas mixture to be introduced into a catalyst layer may preferably be 1.0:0.7–1.0. In case the ratio of hydrogen is higher than said range, the yield of saturated alcohol increases. Further, to incorporate into said gas a gaseous material as a third component, which has nothing to do with the reaction, such as, for example, water vapor or nitrogen, is also effective for moderating the temperature of the catalyst layer in order to inhibit undesirable side reactions and prolong the catalyst life. As the third component, water vapor is particularly effective and preferable, since the resulting reaction product can be collected with ease.

For the purpose of the present invention the conversion of unsaturated aldehyde in one pass of reaction should be inhibited to less than 85%. Particularly, when gas phase reaction apparatus of commercial scale is used, it is preferable to restrain the conversion to a low degree. In case the conversion becomes more than 85%, the formation of saturated alcohol is marked.

Another significant characteristic of the catalyst of the present invention lies in that the catalyst can be recovered with extreme ease. As mentioned before, the conventional catalyst, which is prepared by calcining nickel nitrate composed mainly of nickel and the remainder combination of various activators and which is used for the production of butyraldehyde by partially hydrogenating selectively crotonaldehyde according to the gas phase reaction mode, has a high activity and a high selective reactivity in itself and is useful. The unique drawback of this catalyst is that it is effected in a disadvantageous manner by the presence of iron. An aqueous solution of nickel nitrate, obtained by calcining a discarded catalyst deprived of its activity and extracting with dilute nitric acid, is contaminated with iron, which has been incorporated therein during the preparation of the catalyst, during its uses, and during the recovery operations carried out with the discarded catalyst.

For example, data obtained through the following experiment show this fact: A catalyst was prepared by using pumice as a carrier and incorporating 10 g. of nickel and 2 g. of sodium dichromate (0.80 g. as chromium) into 100 ml. of finished catalyst carried by said pumice, and the catalyst was put in a multi-tube reactor for commercial production. This catalyst was discarded after having been employed continuously in the production of butyraldehyde for 37 days according to the gas phase reaction mode under the following reaction conditions:

Reaction temperature=120°–150° C.
Crotonaldehyde vapor: hydrogen=1:0.7–0.9 (molar ratio)
Water vapor mixing ratio=0.8–1.1 mol per mol of crotonaldehyde
Space velocity of crotonaldehyde=100/hr.

From said discarded catalyst, an aqueous solution of nickel nitrate was recovered by calcining said catalyst in air at 450° to 500° C. to burn organic substances, crushing the catalyst, charging the crushed catalyst into a stainless steel vessel, treating the catalyst with an equal amount of 30% nitric acid to heat and dissolve the catalyst components and washing the catalyst three times with an equal amount of water employing ⅓ of the water each time. 100 ml. of the recovered aqueous solution of nickel nitrate contained 4.3 g. of nickel, 0.8 g. of iron and 0.34 g. of chromium.

By use of the said recovered nickel solution, the present inventors prepared, in their laboratory, a catalyst having a different nickel concentration by decomposing the nitrate carried by crushed pumice grains washed with hot dilute nitric acid, having a grain size of 5–9 mm., and hydrogenating said grains. Then the inventors examined the partial hydrogenation of crotonaldehyde at 120° C. in a 25 mm. $\phi$ reaction tube in the presence of said catalyst under the following conditions:

Crotonaldehyde:hydrogen=1:1 (molar ratio)
Space velocity of crotonaldehyde=100/hr.

The results of these experiments are set forth in Table 1.

TABLE 1

| Experiment No. | 1 | 2 | 3 | 4 |
|---|---|---|---|---|
| Catalyst composition (g./100 ml. catalyst): | | | | |
| Nickel | 12.2 | 9.9 | 7.9 | 6.1 |
| Iron | 2.45 | 1.9 | 1.55 | 1.2 |
| Chromium | 0.97 | 0.78 | 0.63 | 0.48 |
| Composition of product (percent): | | | | |
| Crotonaldehyde | 5 | 7 | 12 | 16 |
| Butyraldehyde | 57 | 70 | 78 | 79 |
| Butanol | 26 | 15 | 6 | 2 |
| Residue | 12 | 8 | 4 | 3 |

In the case of the catalyst compositions employed in Experiment Nos. 1 and 2, selectivities for partial hydrogenation were low and large amounts of butanol were obtained as a by-product while the catalysts were fresh, as shown in Table 1. Also, the formation and the decomposition of high boiling substances were marked. Moreover, the activities of the catalysts were lowered so rapidly that several days after no conversion of crotonaldehyde occurred. On the other hand, in the case of the catalyst compositions used in Experiment Nos. 3 and 4, said drawbacks were markedly improved and they gave results as good as those of the original catalyst of the nickel-sodium dichromate system.

Each of the above-listed experiments employed, as the composition of recovered catalyst, the composition of aqueous nitrate solution per se extracted from a discarded catalyst, except that the nickel concentration was lowered. In this case, however, it does not matter or is it rather necessary, in general, to adjust the composition to a desired one by properly supplementing wanted components. Further, the recovery of discarded catalyst may be repeated in the aforementioned ways.

As a process for recovering and regenerating a discarded catalyst, the following method is also effective:

Namely, it is also possible to regenerate a discarded catalyst by calcining it to burn and remove organic substances adhered thereto, mixing a suitable amount (0.2–0.3 part per part of the discarded catalyst) of crushed pumice (desirably having the same grain size as that of the discarded catalyst), with the discarded catalyst, which is kept in the original form, adding thereto dilute nitric acid (containing $HNO_3$ of 1.1–1.2 times the amount of nitric acid sufficient to dissolve nickel and iron present in the discarded catalyst) having an appropriate concentration until the solids are completely covered, supplementing an activator if necessary, heating the resulting mixture for several hours, heating it to dryness while stirring on a stainless steel vessel (dish type), calcining it to decompose nitrate, and then reducing with hydrogen. This process was carried out, for example, in the following manner:

To a calcined discarded catalyst having the aforementioned composition, 3 parts by volume of crushed pumice per 10 parts by volume of said discarded catalyst were added. To the resulting mixture were added 7 parts by volume of dilute nitric acid containing 0.9 g./100 ml. of catalyst was 11.5–11.8 parts by volume. This was calcined at 400°–500° C. and further reduced with hydrogen to obtain a catalyst. The catalyst thus obtained had favorable activity as well as selectivity and was satisfactory as a catalyst for selective partial hydrogenation. 100 ml. of the finished catalyst contained 7.5 g. of nickel, 1.5 g. of iron and 2.0 g. of sodium dichromate.

Generally, the recovery and regeneration of the catalyst can be repeated without supplementing nickel until the ratio by weight of nickel to iron becomes approximately 1:1.

(1) *Catalyst prepared by adding iron to a nickel-sodium chromate system*

(i) *Preparation of catalyst.*—Pumice grains crushed into a grain size of 5–9 mm. were cleansed with hot dilute nitric acid, washed with water and dried to obtain refined pumice grains which were employed as a carrier. This pumice had an ability of carrying about 17 g. of metal, at its maximum, per 100 ml. of catalyst. To a definite amount of said refined pumice, an aqueous solution of proper concentration, obtained by dissolving simultaneously nickel nitrate, sodium chromate and iron nitrate, was added in such a calculated amount that the finished catalyst contained desired amounts of catalyst components. The resulting mixture was gradually evaporated to dryness and heated at 450° C. for several hours after drying to decompose and remove nitric acid, followed by reduction with hydrogen at 450° C. for an additional 5–10 hours to obtain the desired catalyst.

(ii) *Process of experiments.*—100 ml. of the catalyst was charged in a steel pipe of 25 mm. in inner diameter and heated from the outside by means of an electric heating wire. A gas mixture comprising equimolar amounts of crotonaldehyde and hydrogen was passed through from the upper end of the steel pipe at such a rate that the space velocity of crotonaldehyde became 100/hr., while controlling the temperature at the center part of the catalyst to 120° C. The reaction product was coagulated and collected with cold water at about 5° C. and the composition thereof was measured by distillation analysis.

(iii) *Results of experiments.*—The composition of catalyst and the results of analysis were as follows:

TABLE 2.—Ni-Na₂Cr₂O₄-Fe SYSTEM CATALYST

| Catalyst No. | Catalyst composition (g./100 ml. catalyst) | | | Composition of product (weight percent) | | | |
|---|---|---|---|---|---|---|---|
| | Metallic nickel | Sodium chromate | Metallic iron | Crotonaldehyde | Butyraldehyde | Butanol | Residue |
| 1 | 12.0 | 0.0 | 0.0 | 4 | 61 | 28 | 7 |
| 2 | 10.0 | 0.0 | 0.0 | 7 | 67 | 21 | 5 |
| 3 | 8.0 | 0.0 | 0.0 | 10 | 70 | 15 | 5 |
| 4 | 10.0 | 3.5 | 0.0 | 12 | 81 | 4 | 3 |
| 5 | 8.0 | 2.8 | 0.0 | 16 | 78 | 3 | 3 |
| 6 | 8.0 | 2.8 | 2.0 | 10 | 79 | 6 | 5 |
| 7 | 8.0 | 2.8 | 3.0 | 8 | 76 | 10 | 6 |
| 8 | 8.0 | 2.8 | 4.0 | 7 | 68 | 18 | 7 |
| 9 | 8.0 | 2.8 | 5.0 | 5 | 62 | 24 | 9 |
| 10 | 6.0 | 3.5 | 4.0 | 15 | 79 | 3 | 3 |
| 11 | 6.0 | 3.5 | 5.0 | 13 | 77 | 6 | 4 |
| 12 | 5.0 | 2.8 | 5.0 | 11 | 76 | 8 | 5 |
| 13 | 3.0 | 2.8 | 5.0 | 18 | 62 | 13 | 7 |
| 14 | 3.0 | 2.8 | 3.0 | 23 | 70 | 4 | 3 | sodium bicarbonate and 45 g./100 ml. of nitric acid. To this mixture, a proper amount of water may be added, if necessary, until the solids are completely covered with the solution. The resulting solution was heated for several hours at such a temperature wherein the dilute nitric acid did not boil (80°–90° C.). The total amount was charged into a stainless steel flat dish and heated, while stirring moderately, to evaporate the liquid portion to dryness. Several percent by weight of solids were crushed during said operations and the amount available as a fixed bed Catalyst Nos. 4 and 5 are those having been considered, by the present inventors, as the standard compositions of conventional catalysts. In case iron is added to these catalysts, their activities gradually become higher, which results in the formation of a large amount of high polymerization by-products as well as in forming a large quantity of butanol. Therefore, where the formation of butanol as a by-product is objectionable, these catalysts are not preferred. Moreover, the decomposition reaction of crotonaldehyde, which is merely 2–3% when a standard catalyst of this system is used, increases up to 7–10%. Therefore, the efficiency of conversion from crotonaldehyde to butyraldehyde is markedly lowered.

In the aforesaid case, when the nickel content is decreased accordingly as the iron content is increased, said activity is gradually improved to give a catalyst having a favorable efficiency, which compares quite well with the catalyst of standard composition, until a certain ratio of nickel to iron is reached.

(2) *Catalyst prepared by adding iron to a nickel-alkali metal salt system*

The activity as well as the efficiency of a nickel-alkali metal salt system catalyst is also obstructed by the presence of iron, and the present invention is applicable thereto.

Preparation of catalyst, conditions of the experiment and the process of the experiment are the same as in (2). The results of the experiment were as shown in Table 3.

The catalyst of this system is also deteriorated gradually in properties with the incorporation of iron, but it can be made into an effective catalyst on decreasing its nickel content.

(3) *Catalyst prepared by adding iron to a Ni-Al, Cr, Mg oxides system*

(i) *Preparation of catalyst.*—The process of preparation is the same as mentioned before. All these metals employed as catalyst components are in the form of nitrates.

(ii) *Process of experiment.*—Reaction conditions as well as the process of experiment are the same as the preceding experiments except the reaction temperature.

(iii) *Results of experiment.*—The catalyst of this system has a favorable selectivity of reaction, but when iron is not added, its activity is low at low temperatures. Preferable temperature of reaction is 150°–180° C. It has been found that on adding iron, this catalyst shows sufficient activity even at a temperature lower than its intrinsic reaction temperature without losing its favorable selectivity to form a novel catalyst having excellent catalytic ability.

TABLE 3.—Ni-ALKALI METAL SALTS-Fe SYSTEM

| Catalyst No. | Catalyst composition (g./100 ml. catalyst) | | | Composition of reaction product (weight percent) | | | |
|---|---|---|---|---|---|---|---|
| | Metallic nickel | Alkali metal salt | Metallic iron | Crotonaldehyde | Butyraldehyde | Butanol | Residue |
| 15 | 10.0 | NaCl, 2.8 | 0.0 | 10 | 83 | 5 | 2 |
| 16 | 10.0 | NaCl, 2.8 | 2.0 | 6 | 82 | 8 | 4 |
| 17 | 10.0 | NaCl, 2.8 | 4.0 | 5 | 69 | 17 | 9 |
| 18 | 8.0 | NaCl, 2.8 | 4.0 | 8 | 79 | 8 | 5 |
| 19 | 6.0 | NaCl, 2.8 | 4.0 | 11 | 82 | 4 | 3 |
| 20 | 5.0 | NaCl, 2.8 | 4.0 | 16 | 78 | 4 | 2 |
| 21 | 10.0 | $K_2SO_4$, 1.18 | 0.0 | 12 | 81 | 3 | 4 |
| 22 | 10.0 | $K_2SO_4$, 1.18 | 2.0 | 7 | 83 | 5 | 5 |
| 23 | 10.0 | $K_2SO_4$, 1.18 | 4.0 | 4 | 71 | 15 | 10 |
| 24 | 8.0 | $K_2SO_4$, 1.18 | 4.0 | 9 | 77 | 7 | 7 |
| 25 | 6.0 | $K_2SO_4$, 1.18 | 4.0 | 12 | 79 | 5 | 4 |
| 26 | 4.0 | $K_2SO_4$, 1.18 | 4.0 | 16 | 78 | 3 | 3 |
| 27 | 10.0 | $NaNO_2$, 3.35 | 0.0 | 9 | 82 | 5 | 4 |
| 28 | 10.0 | $NaNO_2$, 3.35 | 2.0 | 6 | 80 | 8 | 6 |
| 29 | 10.0 | $NaNO_2$, 3.35 | 4.0 | 3 | 68 | 18 | 11 |
| 30 | 8.0 | $NaNO_2$, 3.35 | 4.0 | 5 | 82 | 7 | 6 |
| 31 | 6.0 | $NaNO_2$, 3.35 | 4.0 | 10 | 82 | 4 | 4 |
| 32 | 4.0 | $NaNO_2$, 3.35 | 4.0 | 13 | 80 | 4 | 3 |

TABLE 4.—NiAl, Cr, Mg OXIDES-Fe SYSTEM

| Catalyst No. | Catalyst composition (g/100 ml. catalyst) | | | Reaction temperature (° C.) | Composition of reaction product (weight percent) | | | |
|---|---|---|---|---|---|---|---|---|
| | Metallic Ni | Metal oxide | Metallic iron | | Crotonaldehyde | Butyraldehyde | Butanol | Residue |
| 33 | 10.0 | $Al_2O_3$, 2.15 | 0.0 | 150 | 8 | 82 | 5 | 5 |
| 34 | 10.0 | $Al_2O_3$, 2.15 | 2.0 | 110 | 5 | 80 | 7 | 8 |
| 35 | 10.0 | $Al_2O_3$, 2.15 | 4.0 | 110 | 2 | 68 | 18 | 12 |
| 36 | 8.0 | $Al_2O_3$, 2.15 | 4.0 | 110 | 6 | 81 | 7 | 6 |
| 37 | 6.0 | $Al_2O_3$, 2.15 | 4.0 | 110 | 12 | 79 | 5 | 4 |
| 38 | 4.0 | $Al_2O_3$, 2.15 | 4.0 | 110 | 19 | 77 | 2 | 2 |
| 39 | 10.0 | $Cr_2O_3$, 1.62 | 0.0 | 170 | 5 | 88 | 3 | 4 |
| 40 | 10.0 | $Cr_2O_3$, 1.62 | 2.0 | 120 | 3 | 86 | 6 | 5 |
| 41 | 10.0 | $Cr_2O_3$, 1.62 | 4.0 | 120 | 2 | 78 | 12 | 8 |
| 42 | 10.0 | $Cr_2O_3$, 1.62 | 5.0 | 120 | 2 | 65 | 21 | 12 |
| 43 | 8.0 | $Cr_2O_3$, 1.62 | 4.0 | 120 | 4 | 82 | 8 | 6 |
| 44 | 6.0 | $Cr_2O_3$, 1.62 | 4.0 | 120 | 9 | 84 | 3 | 4 |
| 45 | 4.0 | $Cr_2O_3$, 1.62 | 4.0 | 120 | 13 | 82 | 3 | 2 |
| 46 | 2.0 | $Cr_2O_3$, 1.62 | 4.0 | 120 | 25 | 71 | 2 | 2 |
| 47 | 10.0 | $Cr_2O_3$, 0.81 | 0.0 | 170 | 5 | 90 | 2 | 3 |
| 48 | 10.0 | MgO, 0.92 | 2.0 | 120 | 2 | 86 | 7 | 5 |
| 49 | 10.0 | MgO, 0.92 | 4.0 | 115 | 2 | 79 | 12 | 7 |
| 50 | 8.0 | MgO, 0.92 | 4.0 | 115 | 4 | 84 | 7 | 5 |
| 51 | 6.0 | MgO, 0.92 | 4.0 | 115 | 9 | 83 | 4 | 4 |
| 52 | 4.0 | MgO, 0.92 | 4.0 | 115 | 17 | 79 | 2 | 2 |
| 53 | 4.0 | MgO, 0.92 | 4.0 | 120 | 10 | 83 | 4 | 3 |

*(4) Catalyst prepared by adding iron to a Ni-chromium oxide-Mn system*

As explained in the preceding paragraph, the preferable temperature to be employed with a Ni-metal oxide system catalyst is high. In order to lower said temperature, this Ni-chromium oxide-Mn system catalyst has been devised. In the case of the catalyst of this system also, the addition of iron could give satisfactory results.

Processes for the preparation and for the experiment carried out with this catalyst are the same as in the preceding paragraph. The reaction temperature is 120° C.

TABLE 5.—Ni-CHROMIUM-Mn-Fe SYSTEM CATALYST

| Catalyst No. | Catalyst composition (g./100 ml. catalyst) | | | | Reaction product composition (weight percent) | | | |
|---|---|---|---|---|---|---|---|---|
| | Metallic nickel | Chromium oxide | Manganese oxide | Metallic iron | Croton-aldehyde | Butyr-aldehyde | Butanol | Residue |
| 54 | 10.0 | $Cr_2O_3$, 1.62 | Mno, 0.72 | 0.0 | 13 | 81 | 3 | 3 |
| 55 | 10.0 | $Cr_2O_3$, 1.62 | 0.29 | 0.0 | 10 | 84 | 3 | 3 |
| 56 | 10.0 | $Cr_2O_3$, 1.62 | 0.29 | 2.0 | 5 | 81 | 9 | 5 |
| 57 | 10.0 | $Cr_2O_3$, 1.62 | 0.29 | 4.0 | 2 | 70 | 19 | 9 |
| 58 | 8.0 | $Cr_2O_3$, 1.62 | 0.29 | 4.0 | 6 | 78 | 10 | 6 |
| 59 | 6.0 | $Cr_2O_3$, 1.62 | 0.29 | 4.0 | 11 | 82 | 3 | 4 |
| 60 | 4.0 | $Cr_2O_3$, 1.62 | 0.29 | 4.0 | 18 | 77 | 2 | 3 |

As seen from the results of the experiments above, when iron is further added to a catalyst having such a composition that it is considered as a standard, the selectivity of the catalyst is lost, resulting in a higher production rate of the by-product butanol. Also, many side reactions occur, whereby not only the formation rate of high polymerizates is increased but the decomposition becomes vigorous to lower over-all efficiencies. In such cases, when the nickel content in the catalyst is decreased relative to the iron content, its selectivity is recovered. The iron content in the catalyst thus partakes both of main catalytic action and cocatalytic action.

Advantages obtainable by practice of the process of present invention are:

(1) A part of nickel can be substituted by inexpensive iron without any variation in effects.

(2) As the presence of iron in the catalyst is permitted in the range defined herein, commercially available nickel (as catalyst) or other metals or compounds (as activator) can be used.

(3) A method for recovering the catalyst has been carried out, in general, by heating in air a catalyst deprived of its activity to burn a resinous polymer adhered thereto and treating the burnt material with hot dilute nitric acid in a stainless steel vessel to extract soluble components in the discarded catalyst as an aqueous nitrate solution. In this case, however, a marked amount of iron is present together with the original components of the catalyst. Therefore, when the catalyst has been prepared by conventional procedures, said iron has caused undesirable side reactions and hence the iron content has been required to be separated. In the present invention, however, since the iron is one of the components of the catalyst, no such operations are required but merely the measuring of the iron content to control the ratio of catalyst components.

The following examples demonstrate the present invention as applied to commercial production apparatus.

EXAMPLE 1

(1) *Preparation of catalyst.*—15 kg. of metallic nickel and 9 kg. of soft steel flakes were dissolved in 40% nitric acid, to which water was so added as to form an aqueous nitrate solution having a nickel concentration of 10 g./100 ml. To this solution, 25 kg. of sodium chromate ($Na_2CrO_4 10H_2O$) was added and dissolved. Pumice, employed as a carrier, was prepared by crushing into 10–12 mm. size, washing with water to wash off its particles and drying.

300 l. of said pumice was charged in the aforesaid aqueous nitrate solution and the solution was heated gently to evaporate it to dryness. The resulting dried material was calcined at 450° C. in a muffle furnace to decompose the nitrate and was then reduced in a hydrogen current to obtain a catalyst.

100 ml. of the catalyst thus obtained contained 4.85 g. of metallic nickel, 3.52 g. of metallic iron and 1.25 g. of chromium compound as metallic chromium.

(2) *Production of butyraldehyde.*—Apparatus employed for production was a cell and tube type reactor having a large number of reaction tubes of 41.6 mm. in inner diameter and 2.2 m. in length. The above-mentioned catalyst was charged in said tubes and hot oil was circulated in cells outside the tubes to control the reaction temperature.

Initial reaction temperature was 112° C., measured at the center of the catalyst. The reaction temperature was gradually raised up to 150° C. according to the relative difficulty in controlling the reaction temperature and to the rate of conversion. Since the formation of butanol becomes higher at above 150° C., the use of said catalyst was discontinued at a proper temperature before the reaction temperature reached 150° C.

The reaction was carried out by maintaining the space velocity of crotonaldehyde at 100±5/hr., the molar ratio of crotonaldehyde to hydrogen at 0.9–1.0 and the conversion rate from crotonaldehyde to butyraldehyde at 50–70%, whereby it was possible to operate continuously for 58 days. Unreacted crotonaldehyde was recycled and the yield of butyraldehyde reached 92%.

EXAMPLE 2

25 g. of nickel nitrate [$Ni(NO_3)_2 \cdot 6H_2O$], 21 g. of ferric nitrate [$Fe(NO_3)_3 \cdot 9H_2O$] and 1.25 g. of anhydrous Glauber's salt were dissolved in 100 ml. of water. The resulting aqueous solution was mixed with 100 ml. of crushed pumice having a grain size of 4–6 mm. and was heated dry with gentle stirring. On heating the dried pumice for several hours in a muffle furnace maintained at 450°–500° C., nitrates contained in the pumice were decomposed. The thus obtained oxide was put in a circular furnace of the type heating from the outside, reduced at 420°–450° C. by introducing hydrogen, cooled down to room temperature in a hydrogen stream, and taken out after substituting nitrogen for the hydrogen. The thus obtained catalyst is not inflamed, unlike conventional nickel catalysts, and therefore not only can it be safely handled even in air but also it can be stored in its dried state in a nitrogen current.

95 ml. of this catalyst was charged into a vertical reactor made of steel pipe with 25 mm. diameter. Then, acrolein was added at a rate of 30 ml. per hour and evaporated on a crushed pumice layer 10 cm. in height, which had been put on the catalyst layer, while maintaining the temperature at 95°–105° C. by heating from the outside by means of an electric heating wire. Simultaneously, hydrogen was continuously introduced into the reactor at a rate of 9–9.5 l./hr. A vapor discharged from the reactor was condensed by means of a condenser, in which was used a brine having a temperature of −10° C. The analytical values of the condensate were 13–17% of unreacted acrolein, 78–83% of propionaldehyde, 3–5% of propanol and about 4% of high boiling substances. Thus, the analysis shows a favorable activity and selective reactivity of the catalyst and that very little decomposition is obtained.

EXAMPLE 3

A catalyst containing, per 100 ml., 5.5 g. of nickel, 4 g. of iron, 1.2 g. of chromium oxide, and 0.4 g. of manganese oxide was prepared using as a carrier a crushed pumice having a grain size of 4–6 mm. which was obtained by the pyrolysis of nitrates in the same manner as in Example 1. 90 ml. of this catalyst was charged into the same reactor as mentioned in Example 1, to which a 75% aqueous acrolein solution

[acrolein:water::1:1 (mol)]

was added dropwise at a rate of 40 ml./hr., while maintaining the catalyst temperature at 112°–115° C., and hydrogen was simultaneously introduced at a rate of 9 l./hr. The reaction product was cooled down to −5° C., condensed and collected.

The following results were obtained:

| | Percent |
|---|---|
| Acrolein | 74–77 |
| Propanol | 2–2.5 |
| High boiling substances | About 1.5 |
| Propionaldehyde | 93 |

EXAMPLE 4

19.5 g. of nickel nitrate, 25 g. of iron nitrate, 5.3 g. of chromium nitrate and 8 g. of magnesium nitrate were dissolved in 60 ml. of water, with which 100 ml. of pumice crushed into a grain size of 5–7 mm. was mixed. The mixture was evaporated to dryness with agitation and allowed to stand in a muffle furnace maintained at 500° C. to decompose these nitrates. The resulting calcined material was charged into a steel pipe of 25 mm. in inner diameter. Into the steel pipe, hydrogen was introduced to reduce said calcined material for 5 hours while maintaining the temperature at 400°–420° C. by heating the pipe from the outside. After cooling down to room temperature in a hydrogen stream, the gas inside the pipe was substituted with nitrogen and the material was taken out in air. The thus obtained catalyst was charged into the same reactor as mentioned in Example 1. From the top of the reactor, 2-ethylcrotonaldehyde and water were separately added dropwise at rates of 45 g./hr. and 10 g./hr., respectively, while maintaining the temperature of catalyst layer at 125°–130° C., evaporated onto crushed pumice of 10 cm. in height, charged on the catalyst and passed through the catalyst layer.

The composition of the effluent was as follows:

| | Percent |
|---|---|
| Unreacted 2-ethylcrotonaldehyde | 16–21 |
| 2-ethylbutyraldehyde | 74–76 |
| 2-ethylbutanol | 3–4 |
| High boiling substances | 2–4 |
| 2-ethylbutyraldehyde | More than 90 |

What we claim is:

1. A process for producing a saturated aldehyde having from 3 to 6 carbon atoms by the hydrogenation of a corresponding unsaturated aldehyde in the gas phase which comprises contacting a mixture of said unsaturated aldehyde and hydrogen, the molar ratio of said unsaturated aldehyde to said hydrogen being from 1.0:0.7 to 1.0:1.0, with a catalyst consisting essentially of nickel, iron and at least one member selected from the group consisting of alkali metal salts and oxides of aluminum, chromium, magnesium and manganese as activator therefor at a temperature of from about 90° C. to about 150° C., while maintaining a conversion rate of said unsaturated aldehyde of less than 85% based upon the weight of said unsaturated aldehyde, said catalyst having a ratio of nickel to iron of 4.0–9.5:6.0–0.5 by weight and a ratio of said activator to the total amount of nickel plus iron of 3.0–1.0:7.0–9.0 by weight, the total amount of nickel plus iron being 6 to 12 grams per 100 ml. of said catalyst.

2. The process of claim 1, wherein said catalyst is prepared by treating carrier particles with an aqueous solution containing nickel nitrate, iron nitrate and at least one activator source selected from the salts of metals selected from the group consisting of alkali metals, aluminum, chromium, magnesium and manganese, drying the treated particles, heating the treated particles to about 450° C. and reducnig the particles with hydrogen at a temperature of about 450° C.

3. The process of claim 1, wherein the contacting is effected in the presence of an inert diluent gas.

4. The process of claim 3, wherein said inert diluent gas is selected from the group consisting of water vapor and nitrogen.

5. The process of claim 1, wherein said unsaturated aldehyde is crotonaldehyde and the contacting is effected at a space velocity of said crotonaldehyde of about 100/hr.

References Cited by the Examiner

UNITED STATES PATENTS

| 1,730,587 | 10/1929 | Mugdan et al. | 260—601 |
| 1,966,157 | 7/1934 | Young | 252—470 |
| 2,658,921 | 11/1953 | Alheritiere | 260—601 |
| 2,810,761 | 10/1957 | Wheeler | 260—601 |
| 2,812,310 | 11/1957 | Walker | 252—470 |
| 2,948,687 | 9/1960 | Hadley | 252—470 |

FOREIGN PATENTS

| 898,589 | 12/1953 | Germany. |
| 147,118 | 11/1921 | Great Britain. |
| 371,051 | 4/1932 | Great Britain. |
| 371,052 | 4/1932 | Great Britain. |

OTHER REFERENCES

Ipatieff: Catalytic Reactions at High Pressures and Temperatures, MacMillan, 1936, pp. 333–334, 373 and 535.

LEON ZITVER, *Primary Examiner.*

J. J. SETELIK, R. H. LILES, *Assistant Examiners.*